(12) United States Patent
Leonarda van Heck

(10) Patent No.: US 6,733,609 B2
(45) Date of Patent: May 11, 2004

(54) METHOD AND DEVICE FOR CONNECTING THE END OF A FLATTENED TUBE OF PLASTIC FOIL TO THE BEGINNING OF A SUBSEQUENT TUBE

(75) Inventor: Marinus Antonius Leonarda van Heck, Lithoijen (NL)

(73) Assignee: Fuji Seal Europe B.V., Deurne (NL)

( * ) Notice: Subject to any disclaimer, the term of this patent is extended or adjusted under 35 U.S.C. 154(b) by 92 days.

(21) Appl. No.: 09/955,471

(22) Filed: Sep. 18, 2001

(65) Prior Publication Data

US 2002/0074078 A1 Jun. 20, 2002

(30) Foreign Application Priority Data

Oct. 19, 2000 (NO) ............................................. 1016442

(51) Int. Cl.⁷ .............................................. B29C 57/00
(52) U.S. Cl. ...................... 156/159; 156/256; 156/258; 156/304.5
(58) Field of Search ........................ 156/304.2, 304.5, 156/294, 256, 258, 159, 423

(56) References Cited

U.S. PATENT DOCUMENTS

| 3,473,994 A | 10/1969 | Levenson | 156/505 |
| 3,635,504 A | * 1/1972 | Borden et al. | 156/294 |
| 4,610,742 A | * 9/1986 | Rop et al. | 156/158 |
| 4,736,775 A | 4/1988 | Oxley | 138/118.1 |

FOREIGN PATENT DOCUMENTS

| FR | 1277686 | 3/1962 |
| GB | 1208281 | 10/1970 |
| JP | 6355026 | 3/1988 |

* cited by examiner

Primary Examiner—Jeff H. Aftergut
Assistant Examiner—Todd J Kilkenny
(74) Attorney, Agent, or Firm—Ladas & Parry

(57) ABSTRACT

Method and device for connecting the end of a flattened tube of plastic foil to the beginning of a subsequent tube, said tubes being used in particular for applying sleeves onto bottles or like objects. The leading end of the beginning of a flattened tube is provided with an obliquely cut away corner at both longitudinal edges. The thus established two loose lips are separated from each other and the end of the spent tube is slid between the lips and fixed in relation to said lips. The materials of said tubes are melted together by a short-time, pressurized supply of heat.

12 Claims, 8 Drawing Sheets

METHOD AND DEVICE FOR CONNECTING THE END OF A FLATTENED TUBE OF PLASTIC FOIL TO THE BEGINNING OF A SUBSEQUENT TUBE

TECHNICAL FIELD

The invention relates to a method and a device for connecting the end of a flattened tube of plastic foil to the beginning of a subsequent tube, said tubes being used in particular for applying sleeves onto bottles or the like.

BACKGROUND OF THE INVENTION

When using such a tube, it is drawn from a reel. When the end of the tube has been reached, this end has to be connected to the end of a tube being situated on a subsequent reel, to wit in such a way that the process of applying sleeves on subsequent bottles will not be interrupted.

Such a method and device are known from U.S. Pat. No. 3,473,994. According to this document, the beginning of the subsequent tube is put against the end of the spent tube and then fixed with adhesive tape. To that end, both ends should be positioned in relation to one another with extreme accuracy both in longitudinal direction and in transverse direction. This requires a complicated device, which is sensitive to malfunction. In case of inaccurate positioning, malfunctioning may also occur in the machine which is employed for applying the sleeves.

According to another method, the end of the tube from the spent reel can be stuck in the beginning of the tube on the next reel and be fixed with adhesive tape. This has the disadvantage that the inner diameter in reduced across the distance where the beginning of the next tube is stuck in the end or the tube of the spent reel. This can cause problems when applying the sleeves on a bottle with the help of the machine concerned.

SUMMARY OF THE INVENTION

Now the object of the invention is to provide a method in which these difficulties do not arise. This method is characterized by the following steps: the leading edge of the beginning of the flattened tube is provided with an obliquely cut-away corner at both longitudinal edges; the thus established two loose lips are separated from each other; the end of the spent tube is slid between the lips and fixed in relation to said lips.

It has turned out that such a method can easily be carried out. Neither does the method cause any difficulties in further processing of the tube on the machine by which sleeves are mounted on objects, even it parts of both tubes are on top of each other.

In particular it will be provided for, that the end edge of the spent tube is at a distance from those locations of the longitudinal edges of the subsequent tube where the obliquely cut-away corners of said tube end, thus leaving a free space between the longitudinal edges of both flattened tubes.

Through this, it is achieved that there is always an opening, be it a small one, at the point where the tubes are connected to one another, so that air possibly present in the tube is allowed to escape.

For fixing the ends of both tubes in relation to each other, adhesive tape or an "impulse seal" can be used, in which the materials of said tubes are melted together by means of a short-time, pressurized supply of heat.

The invention also relates to a device for applying the method described above. Said device is characterized by: a frame in which some reels of flattened tube can be accomodated; means for supporting the beginnings of subsequent flattened tubes, said beginning being provided with obliquely cut-away corners near its longitudinal edges for forming loose lips; a guide, extending in parallel to said means for supporting the beginnings of the subsequent tubes, for supporting a transport module comprising a beak situated within said tube, which is kept in place by rollers mounted outside of said tube, and a tube transport motor drawing the tube across the beak; with further means being provided for bringing said transport module to a location where the beginning of a subsequent tube is situated and for bringing the end of a tube between the lips of said subsequent tube.

It is desirable that both leading edges of the lips of a subsequent tube are positioned exactly on a certain location.

In connection with that, means will be provided for, such as in the shape of clamping members, for clamping the beginning of a subsequent tube, at a distance from said lips, for the time during which said tube is not used.

It is desirable, that applying sleeves on the objects should not be interrupted on commencing use of a subsequent tube.

To that end, it will be provided for, that after commencing use of a subsequent tube, the transport motor will temporarily move it at a higher speed in order to create a buffer supply, which is used during connecting the end of one tube to the beginning of a subsequent tube.

For connecting the tubes to one another, the device will in particular be provided with sealing beams, which are carried by the transport module and are situated above and below said tube and which can be brought together and be heated for melting the abutting parts of the tubes together where a part of the beak is situated.

The presence of the beak prevents the tubes from being melted to each other internally as well, on account of which the tubes could no longer be pulled across the beak.

Given the relatively small dimensions of the lips of a tube kept in stock, a belt can be used for supporting the lips. This belt need only have a small thickness.

In order to guarantee, that the lips will be at the desired location when they has to be connected to the ends of a tube, the transport module will be provided with belt guides being connected to the belt guided across some rollers and being situated at both sides of the beak and extending to near its lateral edges.

Since a printed foil is used in most cases, it must be provided for that when cutting a sleeve from the tube, the print is situated at the proper position.

In connection with that, the transport module can be provided with a detecting photo cell which, on detection of a certain point of the print, will stop the tube transport motor, a cutting knife being present for cutting the tube in a certain position.

In view of this a cutting knife can be situated at each clamping member for clamping the beginning of a subsequent tube, and operation of the clamping member and the cutting knife can take place by means of a pressurized medium cylinder being located on the transport module.

DESCRIPTION OF THE DRAWINGS

The invention is further explained by way of an embodiment, illustrated in the drawing, in which.

DETAILED DESCRIPTION OF THE INVENTION

Figure 1:
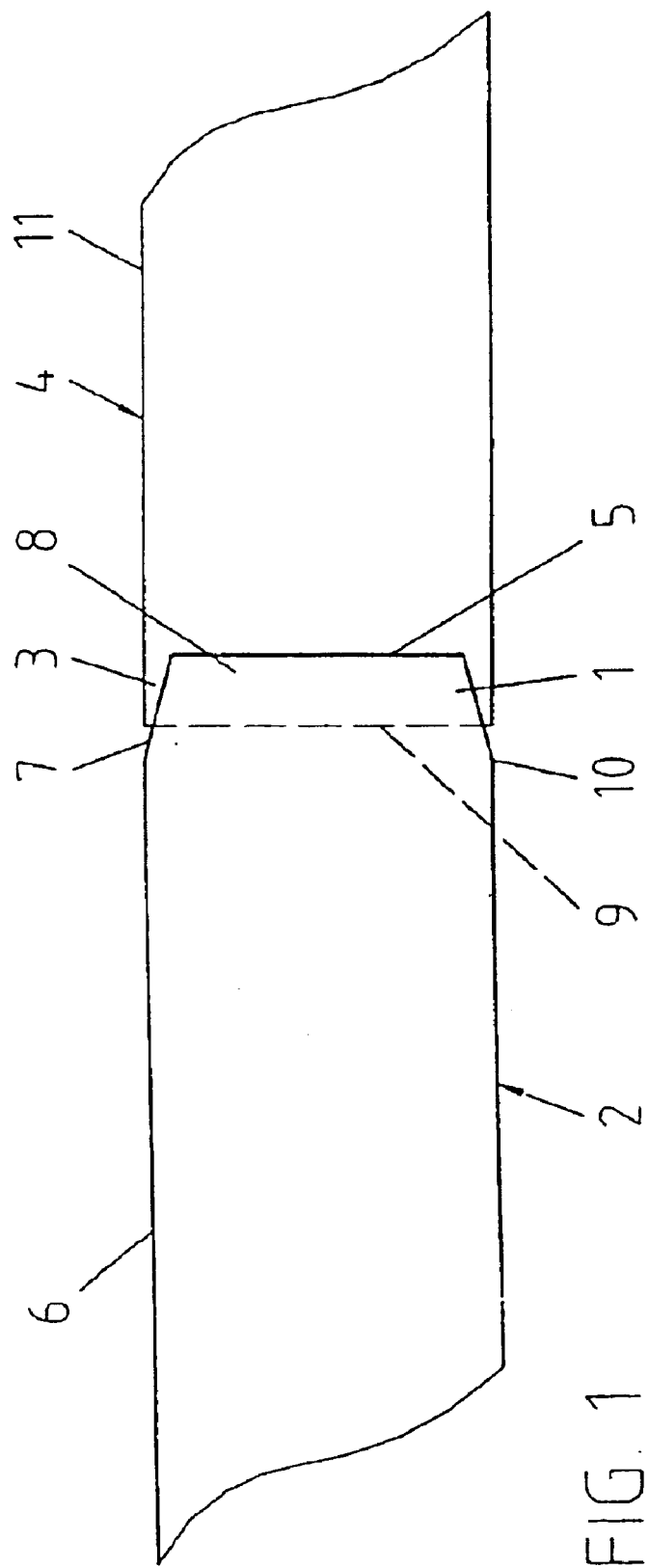
FIG. 1 shows a plan view of a part of a tube which has to be connected to the end of a tube preceding it.
Figure 2:
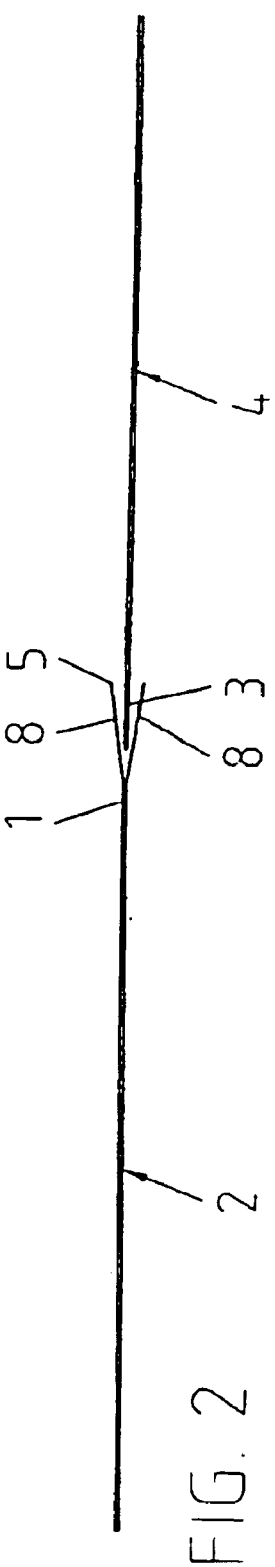
FIG. 2 shows a side view of the parts of FIG. 1.

FIGS. 1 and 2 show the beginning 1 of a tube 2, which must be connected to the end 3 of a spent tube 4. To that end, the leading edge 5 of the beginning 1 is provided with the bevelled corners 7 at the longitudinal edges 6 of the flattened tube 2, for forming lips 8. The end 3 of the tube 4 has been slid between the lips 8 in such a way that the end edge 9 of the end 3 is situated at some distance from the location 10 there the corners 7 end. Thus, the longitudinal edges 6 of the tube 2 end at some distance from the longitudinal edges 11 of the tube 4.

Figure 3:
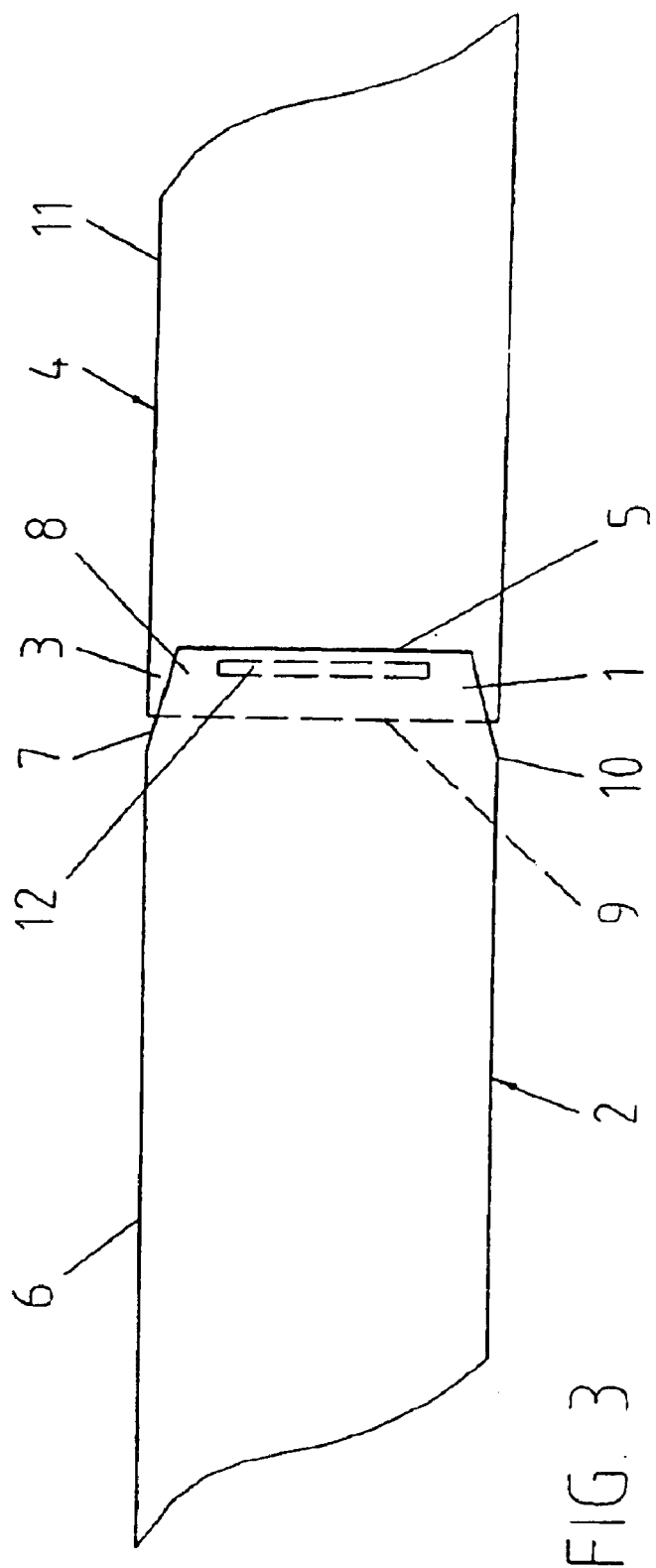
FIG. 3 shows a plan view of the parts of the tubes connected to each other.

FIG. 3 shows the situation after the parts of both tubes 2 and 4 lying on top of each other have been connected to one another by melting them together in the area 12, as will be explained afterwards.

Figure 5:
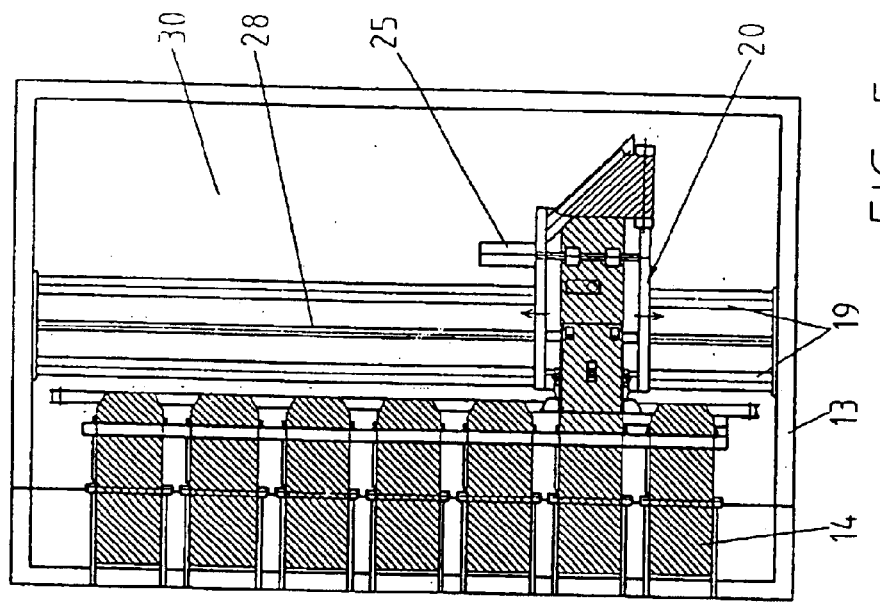
FIG. 5 schematically shows a plan view of the device according to FIG. 4.
Figure 4:
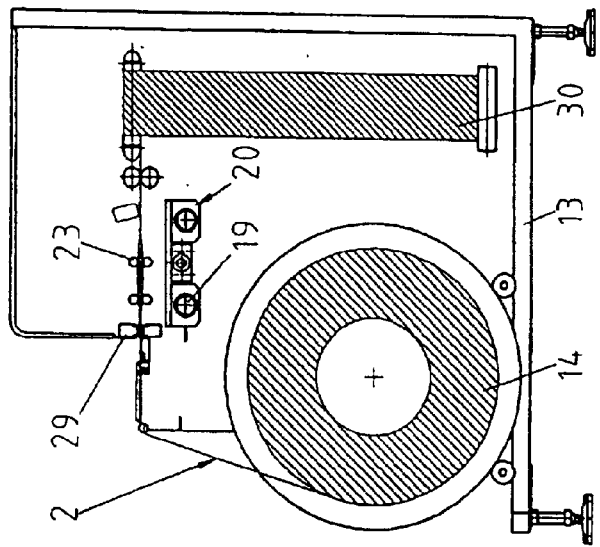
FIG. 4 schematically shows a side view of a device according to the invention.

The device shown in FIGS. 4 and 5 comprises a frame 13 for accomodating a number of reels 14 of tubing 2 next to each other. The reels are supported in a way not further described.

Figure 6:
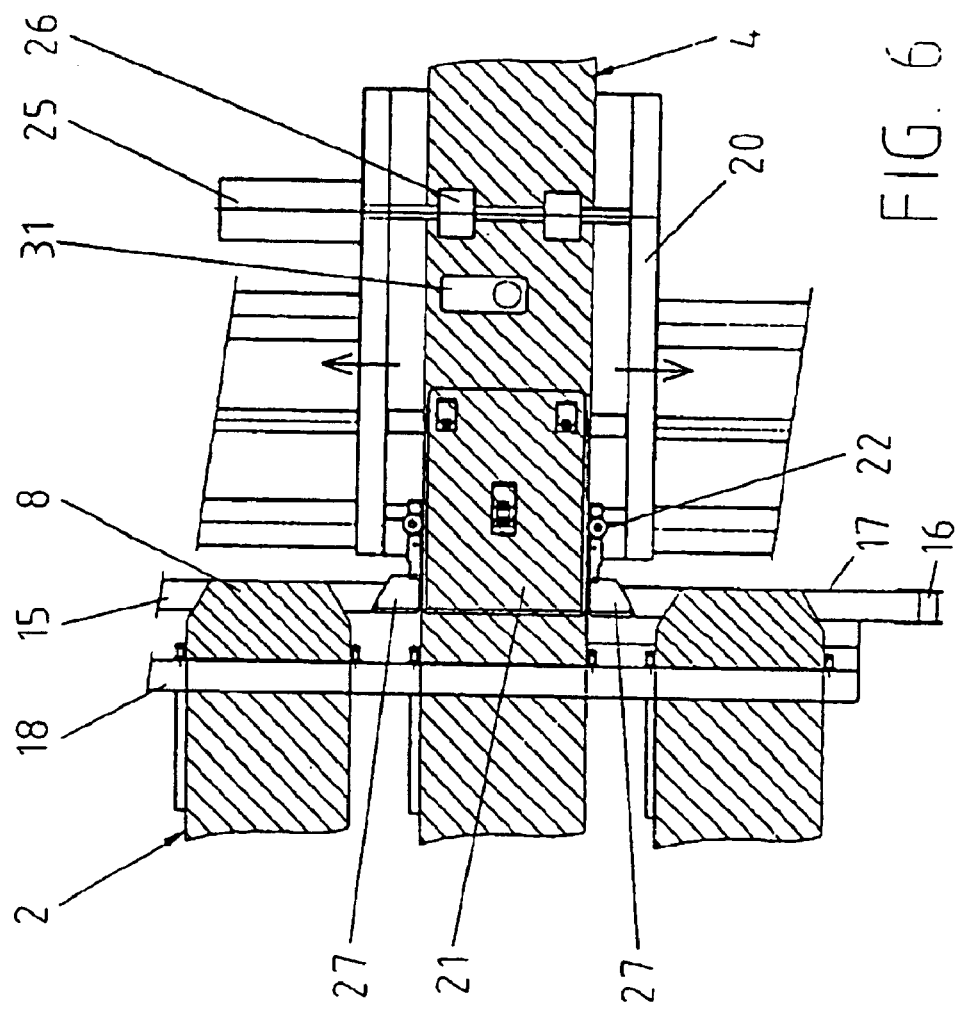
FIG. 6 schematically shows a part of FIG. 5 on an enlarged scale.

As appears from FIG. 6 in particular, the lips 8 of the tubes 2 are supported by a belt 15 which is guided by two reversing roller 16. The leading edges 5 of the lips 8 will coincide with the edge 17 of the belt 15. In order to maintain this position of the lips 8 when the tube 2 is not in use, each tube 2 is fixed in relation to the frame 13 at a distance from the lips 8 by means of a clamping member 18 not further described.

Figure 7:
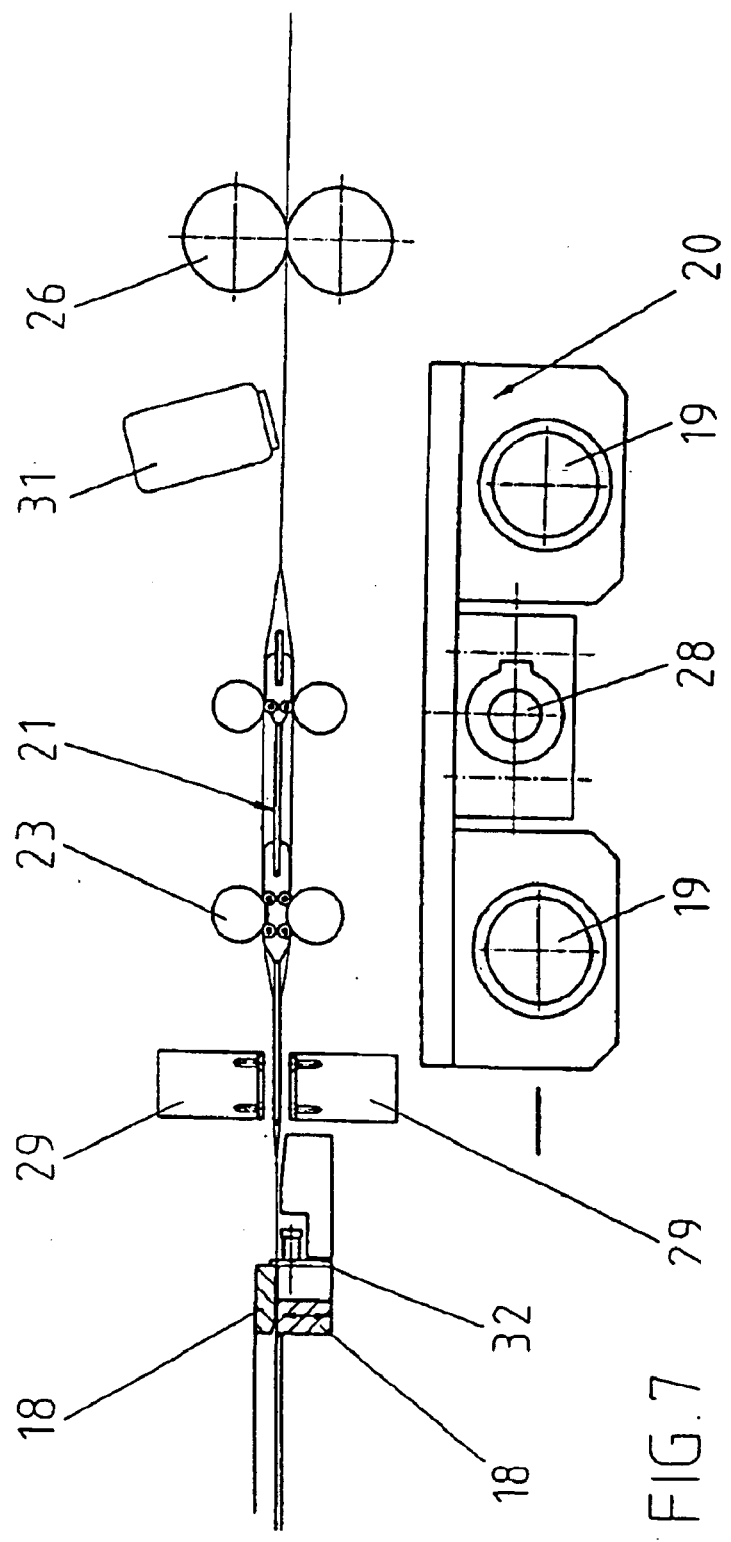
FIG. 7 schematically shows a part of FIG. 1 on an enlarged scale.

The frame 13 is provided with two guides 10, see FIGS. 5 and 7, for supporting a transport module 20. This comprises a beak 21 situated within the tube 2, which is shown in particular in FIGS. 8 and 9. The beak 21 is supported by rollers 22 and 23, some of which are co-operating with rollers 24 located in the interior of said beak, so that the beak is kept in place in vertical and horizontal direction. The rollers 22 and 23 lie against the tube moving across the beak from the outside.

A tube transport motor 25, see FIGS. 5 and 6, mounted to the transport module 20, serves for moving the tube across the beak 21, and has its shaft provided with rollers 26 drawing the tube across said beak 21.

Figure 8:
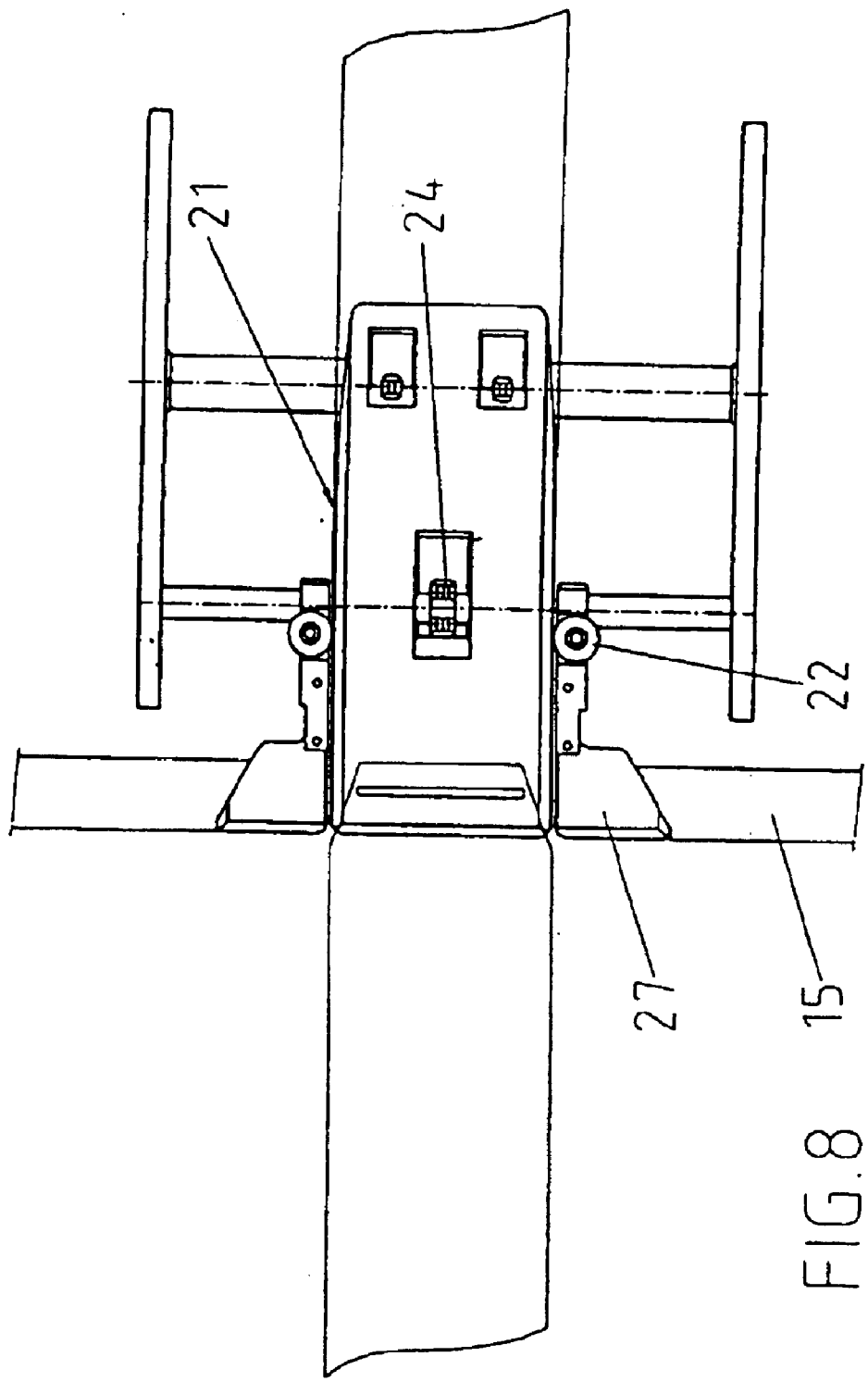
FIGS. 8 and 9 show a plan view and lateral view, respectively, of the beak with some accompanying parts.

As illustrated in FIGS. 6 and 8, the transport module 20 is further provided with belt guides 27 to which the belt 15 is connected, said guides extending to near the lateral edges of the beak 21.

Further, there are means for bringing the transport module 20 to a location where the beginning 1 of a subsequent tube 2 is situated in order to bring the end 3 of a tube 4 between the lips 8 of a tube 2. These means can e.g. be in the form of a threaded rod 28, which can be motor-driven and is received in a nut fixedly received with the transport module 20. During movement of the transport module 20, the tube transport motor 25 is switched-off.

Figure 9:
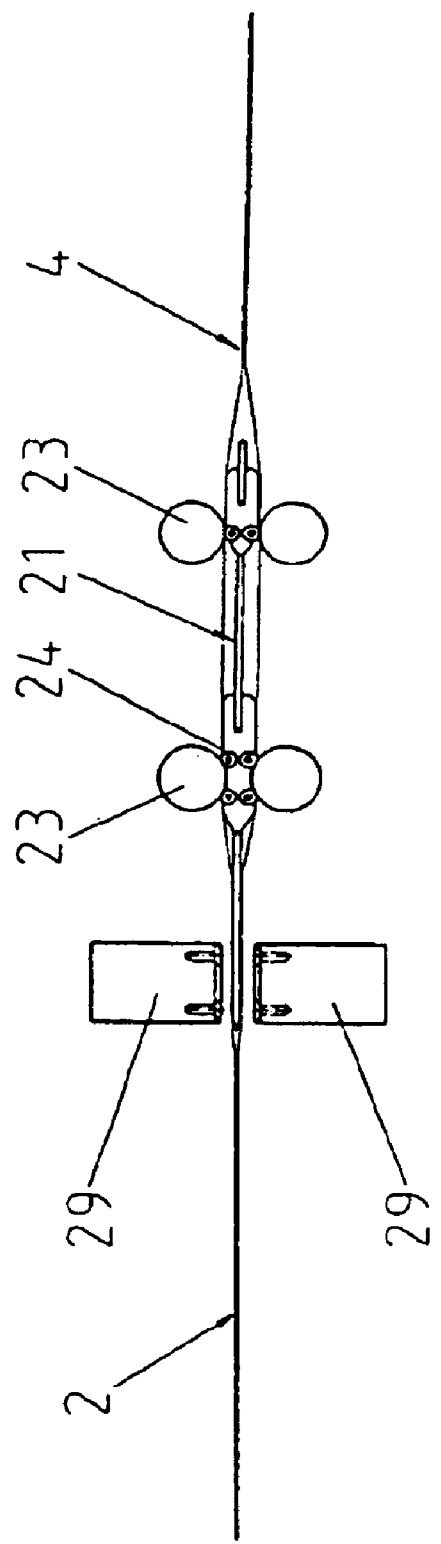

After bringing the end 3 between the lips 8, as illustrated in FIG. 2, the sealing beams 29, see FIGS. 7 and 9 in particular, are moved towards each other and pressed against the tube portions located on the beak 21. Simultaneously, the sealing beams 29 are heated by a short current pulse, as a consequence of which the tube portions are melted together. After the sealing beams have cooled down, they are moved apart again and the tube transport motor 25 is started again. Simultaneously the tube 2 is released from the clamping member 18.

Since the foil of the tubes is locally heated only during the time in which the sealing beams 28 contact the tubes, and the sealing beams are only moved away from each other when they have cooled down, the material or the tubes is prevented from shrinking locally.

During standstill of the tube transport motor 25, tube is drawn from the buffer storage 30, see FIGS. 4 and 5, so that the machine can remain in operation for applying sleeves onto objects. As soon as the tube portions have melted together and the sealing beams 29 have been moved apart, the tube transport motor 25 is switched on again. The motor is first driven at a higher speed, so that the tube 2 is transported at a higher speed than is necessary for the sleeve applying machine. This will cause the buffer storage 30 to be replenished again.

As stated earlier, in most cases a printed foil is used for the tube. Then it must be provided for, that on cutting a sleeve from the tube, the print is located at the proper position.

In connection with that, the transport module 20 is provided with a detection photo cell 31 which, when the end 3 of a tube 4 approaches, will stop the tube transport motor 25 on detection of a certain point of the print.

Underneath each clamping member 18 there is a cutting knife 32 for cutting off the last part of a tube 4 on a certain position. The clamping member 18 and the cutting knife 32 are operated by means of a pressurized medium cylinder, not indicated further, mounted on the transport module 20. After cutting-off the end of the tube 4, the tube transport motor 25 will transport the tube 4 yet slightly further, until the end edge 9 of the tube coincides with the front side of the beak 21. The transport motor will then be stopped and subsequently the transport module is shifted so that the end 3 of the tube 4 will end up between the lips 8 of a tube 2. After that, the connection between the tube portions can take place in the way described above.

Obviously the invention is not limited to the embodiment illustrated in the drawing and described above.

What is claimed is:

1. In a method for connecting ends of first and second flattened tubes, the improvements comprising:
    (a) cutting-away corners at longitudinal edges of the end of the first flattened tube to form lips at the end of the first flattened tube;
    (b) separating the lips of the first flattened tube from each other;
    (c) slipping the end of the second flattened tube between the separated lips of the first flattened tube; and
    (d) fixing at least one of the lips of the first flattened tube to the end of the second flattened tube between the lips.

2. The method according to claim 1, wherein the end of the second flattened tube is at a distance from locations of intersections of the cut-away corners and the longitudinal edges of the first flattened tube for leaving a space between the longitudinal edges of the flattened tubes.

3. The method according to claim 2, wherein the fixing is at least partly by adhesive tape.

4. The method according to claim 3, wherein the fixing melts materials of the flattened tubes together.

5. The method according to claim 4, wherein the materials melt by means of a short time, pressurized supply of heat.

6. The method according to claim 2, wherein the fixing melts materials of the flattened tubes together.

7. The method according to claim 6, wherein the materials melt by means of a short time, pressurized supply of heat.

8. The method according to claim 1, wherein the fixing is at least partly by adhesive tape.

9. The method according to claim 8, wherein the fixing melts materials of the flattened tubes together.

10. The method according to claim 9, wherein the materials melt by means of a short time, pressurized supply of heat.

11. The method according to claim 1, wherein the fixing melts materials of the flattened tubes together.

12. The method according to claim 11, wherein the materials melt by means of a short time, pressurized supply of heat.

* * * * *

UNITED STATES PATENT AND TRADEMARK OFFICE
CERTIFICATE OF CORRECTION

PATENT NO.    : 6,733,609 B2
DATED         : May 11, 2004
INVENTOR(S)   : Marinus Antonius Leonarda Van Heck It is certified that error appears in the above-identified patent and that said Letters Patent is hereby corrected as shown below:

<u>Title page,</u>
Item [30], Foreign Application Priority Data, "NO" should read -- NL --.

Signed and Sealed this

Twenty-third Day of November, 2004

JON W. DUDAS
*Director of the United States Patent and Trademark Office*